United States Patent [19]

Stahlecker

[11] 4,116,505
[45] Sep. 26, 1978

[54] BEARING FOR A SHAFT OF AN OPEN-END SPINNING ROTOR

[75] Inventor: Hans Stahlecker, Süssen, Germany

[73] Assignees: Fritz Stahlecker; Hans Stahlecker, both of Germany

[21] Appl. No.: 843,049

[22] Filed: Oct. 17, 1977

[30] Foreign Application Priority Data

Oct. 22, 1976 [DE] Fed. Rep. of Germany ....... 2647816

[51] Int. Cl.² .................... F16C 1/24; F16C 35/08; D01H 1/12; D01H 7/04
[52] U.S. Cl. .................................. 308/187; 57/58.89; 184/58; 184/85; 308/26; 308/124
[58] Field of Search ............... 308/26, 78, 121, 123, 308/124, 169, 187; 57/58.89, 133, 134; 184/7 F, 58, 59, 66, 76, 84, 85

[56] References Cited

U.S. PATENT DOCUMENTS

| | | | |
|---|---|---|---|
| 3,107,947 | 10/1963 | Drake | 308/26 |
| 3,367,447 | 2/1968 | Consoli et al. | 184/59 |
| 3,711,168 | 1/1973 | Wendel et al. | 308/26 |
| 3,911,659 | 10/1975 | Mandl | 57/58.89 |
| 3,977,496 | 8/1976 | Black | 184/7 F |

*Primary Examiner*—Trygve M. Blix
*Assistant Examiner*—Charles E. Frankfort
*Attorney, Agent, or Firm*—Craig & Antonelli

[57] ABSTRACT

Open-end spinning machine apparatus is provided which includes a spinning shaft with a spinning rotor at one end and a driving whorl at the other. A bearing assembly is provided including two sets of roller bearings spaced axially from one another and in bearing engagement with the spinning shaft. In order to accommodate replenishment of lubricant to the roller bearings during operation, an oil-feed device is provided which is responsive to the speed of the spinning shaft to supply oil thereto. In preferred embodiments, the oil-feed device includes an oil reservoir adjacent a sealing element which faces the spinning shaft, which sealing element is responsive to reduced pressure caused by rotation of the spinning shaft to supply oil thereto, with no oil being supplied with a stopped spinning shaft.

13 Claims, 2 Drawing Figures

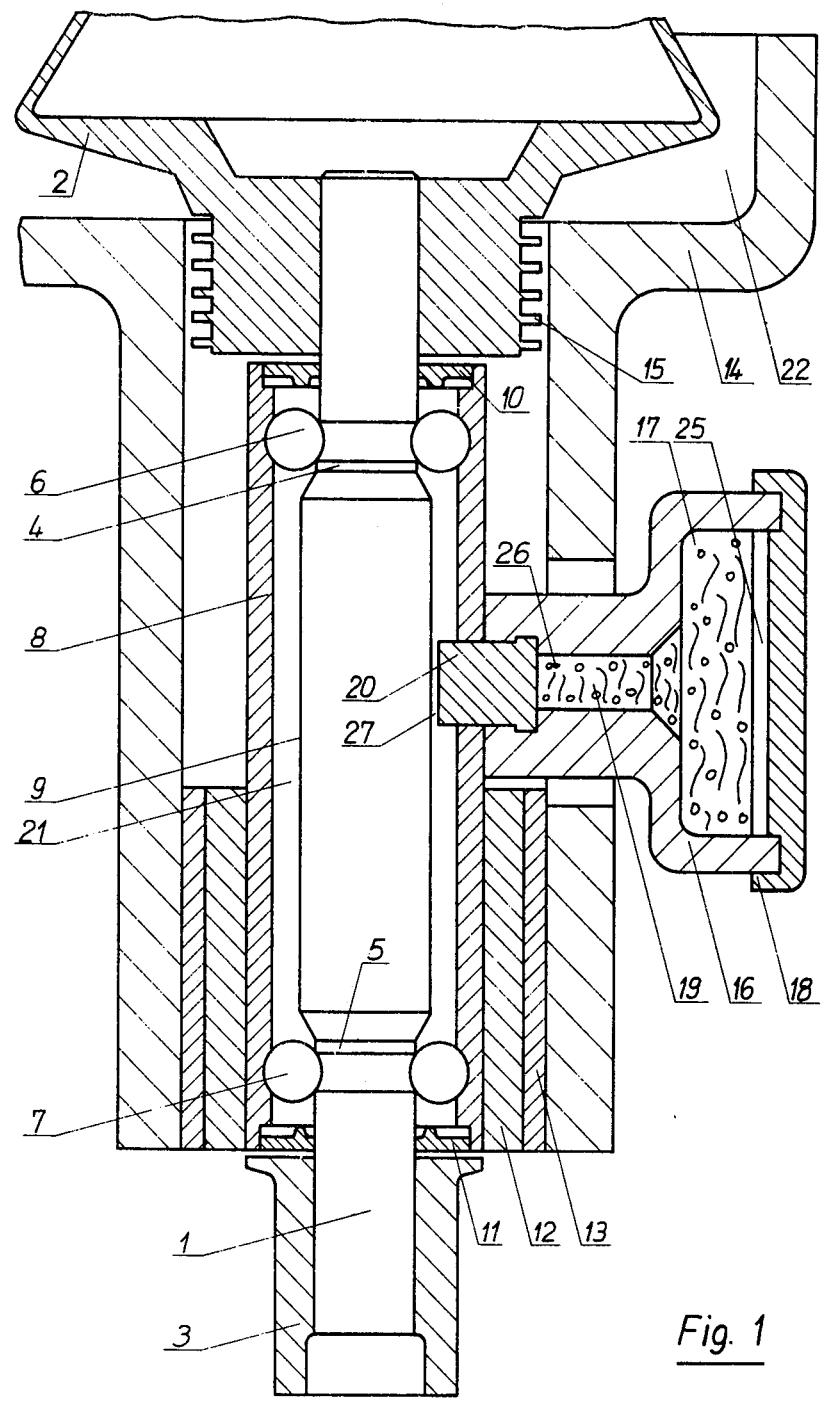

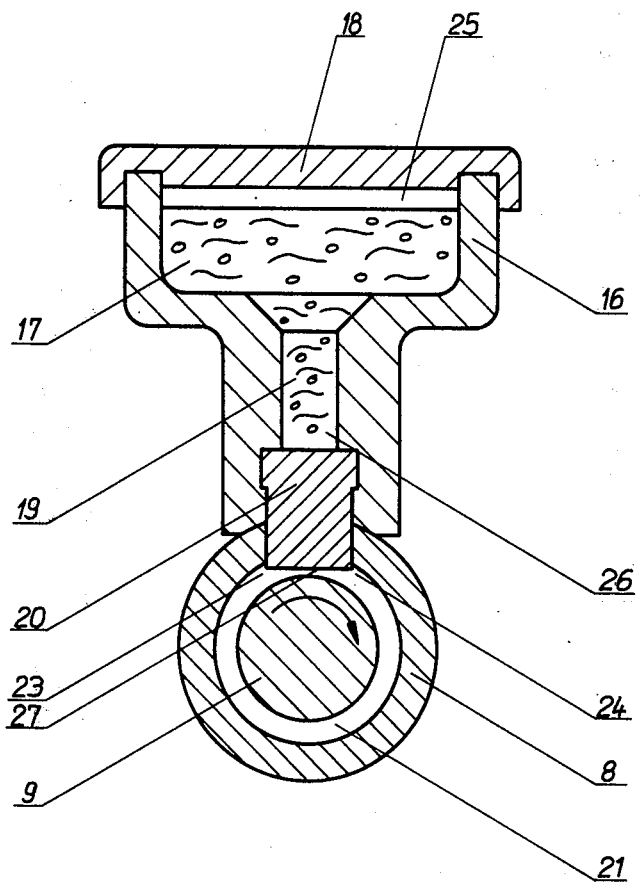

BEARING FOR A SHAFT OF AN OPEN-END SPINNING ROTOR

BACKGROUND AND SUMMARY OF THE INVENTION

The invention relates to a bearing arrangement for a spinning shaft of an open-end spinning rotor of the type provided with a spinning rotor at one end and a driving whorl at the other end. The spinning shaft is mounted in a bushing with two roller bearings having their roller elements running directly upon it, and having associated with it an oil-feed device dispensing oil dropwise in the area between the two roller bearings.

In a known bearing of the type mentioned hereinabove (German Auslegeschrift No. 2,333,555), a deep-groove ball bearing is provided on the portion of the shaft closest to and facing the spinning rotor and a guidance-free roller bearing is provided on the side (portion of the shaft) away from the spinning rotor. The balls of the deep-groove ball bearing run in a groove in the shaft (inner race) and in an outer ring or race, mounted tightly in a bushing. An outer ring, likewise mounted tightly in the bushing, is provided for the rollers of the roller ball bearing. Since the roller bearing is not required to accept any axial loads, greater torques are produced in the radial direction. In order to increase the lifetime of such a bearing, it is provided that the normal conventional grease lubrication may be replaced by an oil lubrication. An oil-feed device is provided for this purpose, said device being disposed in the area between the roller bearings and dispensing oil to the shaft dropwise. The oil-feed device contains a wick which is submerged in the oil reservoir and extends to the vicinity of the shaft. The amount of oil dispensed in this device depends on the distance between the oil reservoir and the shaft and upon the cross section of the wick. It appears very difficult if not impossible to meter the oil feed in this design in such manner that it corresponds to the actual oil requirement of the two roller bearings. In this design, oil continues to be supplied even when the spinning rotor is stopped for a period of time, and, when the spinning rotor of a spinning assembly or the entire spinning machine has been stopped for a long period of time, this can result in a considerable amount of excess oil being supplied, which is unacceptable in practice.

An object of the invention is to provide oil lubrication for a bearing of the type described hereinabove, said lubrication making possible an exact metering of the oil to be supplied in accordance with the requirements of the roller bearings. The invention contemplates providing that the oil-feed device comprises a sealing element facing the shaft, said sealing element dispensing oil only at a preset pressure differential which depends upon the operating state of the spinning rotor.

This design of the present invention makes it possible to adjust the volume of oil and the pressure differential exactly with respect to one another so that very exact metering is achieved. In additon, it is ensured that when the spinning rotor is stopped, no oil is supplied, since there is then no pressure differential. This has the advantage that when the spinning assembly or the entire machine is stopped, no unnecessary oil is supplied, which could result in excess oil being supplied. In addition, the oil feed is designed so that the amount of oil which is centrifuged out of the grease lubrication of the roller bearing as a result of the high rotational speed is replaced.

In an advantageous embodiment of the invention, means are provided for the sealing element to face the shaft with a surface which forms a groove with the circumference of the shaft which widens in the rotation direction of the shaft. In this widening groove, a negative pressure is produced by the rotation of the shaft whose magnitude is a function of the rotational speed of the shaft and the geometric shape of the groove. This negative pressure serves to enable the shaft to draw the oil it requires for its bearings.

In another preferred embodiment of the invention, means are provided for the sealing element to consist of a porous material whose porosity is adjusted to the viscosity of the oil in such manner that the sealing element dispenses a specified volume of oil at a preset pressure differential. This design has the advantage that no control or regulating processes controllable externally are required to maintain or meter oil-lubrication. The manufacturing cost also remains within tolerable limits.

In accordance with one important feature of preferred embodiments of the invention, it is provided that the shaft has a diameter in the area between the roller bearings and particularly in the area of the sealing element of the oil-feed device which is larger than the races of the ball bearings. In this way it is possible for the oil dropping on the shaft to be flung off and atomized at higher circumferential velocities. In addition, the advantage is gained that the critical rotational speed of the bearing can be adjusted so that it is above the operating speed of 45,000 min$^{-1}$ for example.

In order to have the largest possible roller elements and therefore smaller roller element and cage speeds, means are advantageously provided such that races for the roller elements are machined into the inner surface of the bushings. It has been found advantageous if each roller bearing has five balls as roller elements, the diameter of said balls being at least 50% of the diameter of the corresponding races (grooves) of the shaft. In this design, it is possible to have large roller bearing balls while the outside dimensions of the bearing bushing remain the same.

In accordance with another important feature of preferred embodiments of the invention, means are provided such that the bushing is supported in a housing with at least one intermediate bushing to absorb impact and vibration, said intermediate bushing extending in the axial direction from the vicinity of the whorl to approximately the center of the bushing. It is also advantageous to have at least two intermediate bushings disposed concentrically to one another between the busing and the housing, said intermediate bushings being made of materials with different properties. This makes it possible on the one hand to reduce the bearing load and on the other hand to limit the possible wobbling of the shaft and hence of the spinning rotor.

In accordance with yet another feature of preferred embodiments of the invention, means are provided such that the oil reservoir is located in an encapsulated housing, provided with a metered, throttled air supply. In this design, a negative pressure then develops inside the housing when oil is removed. When this negative pressure reaches the same value as the negative pressure on the outside of the sealing element, the oil feed will be interrupted until the pressure inside the housing has decreased once more. This results in periodic oil feed and also ensures that no oil is fed when the spinning rotor is stopped.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a schematic cross-sectional view through a bearing assembly for the shaft of an open-end spinning rotor constructed according to the invention; and FIG. 2 is a sectional view through the bearing assembly of FIG. 1, taken in the vicinity of the oil feed device.

DETAILED DESCRIPTION OF THE DRAWINGS

The bearing assembly shown in FIGS. 1 and 2 comprises a spinning rotor 2, mounted on one end of a spinning shaft 1 and having a driving whorl 3 at the other end. Shaft 1 is mounted in a bushing 8 by means of two deep-groove ball bearings, whose balls 6, 7 run in corresponding races 4 and 5 on shaft 1. Balls 6, 7 run externally directly in corresponding races on a bushing 8.

In order to increase the lifetime of the bearings, five roller bearings balls 6 and 7 are provided in each deep-groove ball bearing. In this manner, while keeping comparable dimensions for bushing 8, larger roller bearing balls 6, 7 can be used, but this results in a reduction of the diameter of inner races 4 and 5. The resultant decrease in the critical rotational speed of the bearing is compensated by a thickening shaft 1 in the central area 9 between deep-groove ball bearings 6, 7. Preferably, means are provided such that the diameter of the shaft in area 9 is 1.5 to 2 times the diameter of inner races 4 and 5 (diameter of the bottom of the groove of the inner races). Roller bearing balls 6, 7 in the preferred embodiment make up more than 50% of the diameter of inner races 4 and 5, resulting in a high dynamic torque. It is also advantageous if the shaft 1 can be made diametrically symmetrical, resulting in a considerable simplification of manufacture.

Sealing means 10 and 11, known per se, are provided to seal off deep-groove ball bearings 6 and 7 from the outside. Bushing 8 is held in a housing 14 with interposition of appropriate impact- and noise-damping intermediate bushings 12 and 13, said bushings 12, 13 being disposed concentrically over one another and extending from the vicinity of driving whorl 3 to approximately halfway along bushing 8. Spinning rotor 2 is sealed off from housing 14 by a type of labyrinth seal 15, so that the negative pressure which prevails in the vicinity of spinning rotor 2 is unable to permit grease or oil escaping from the adjacent deep-groove ball bearing 6 into the vacuum chamber 22.

Since a certain amount of oil is centrifuged out of each of the two lubricated deep-groove ball bearings in time, care should be taken to ensure that the same amount of oil in the form of an oil mist is supplied through an oil-feed device. For this reason, an oil container 16 with an oil reservoir 17 is provided above horizontal shaft 1, said reservoir being closed by a cover 18 and conducted through a line 19 to a sealing element 20 made of porous impregnatable material, for example sintered ceramic. This sealing element 20 projects through a hole into the interior of bushing 8 and can dispense oil when a negative pressure acts externally upon it. This is accomplished preferably by virtue of the fact that a greater negative pressure is produced below sealing element 20 in the vicinity 27 of the turning spinning rotor relative to area 26 above sealing element 20. When sealing element 20, which has a boundary area disposed tangentially to area 9, is brought very close to area 9 of shaft 1, rotation of shaft 1 in the direction indicated by the arrow (see FIG. 2) creates a negative pressure in area 24 which expands in an approximately wedge-shaped manner and creates pressure in an opposite, corresponding area 23. The negative pressure in area 24 causes oil to emerge through sealing element 20. The magnitude of the negative pressure is a function of the speed of the shaft, the distance of sealing element 20 from area 9, and the geometric shape of the sealing element, and can be set exactly. When the spinning rotor is stopped, the negative pressure disappears. There is no escape of oil provided that the oil permeability of the sealing element 20 is adjusted to the viscosity of the lubricating oil. The oil droplets escaping from sealing element 20 in area 24 are carried away by the air flow and atomized, and brought to roller bearings 6 and 7 in this form.

Oil container 16 or its cover 18 are preferably made of slightly air-permeable plastic. If cover 18 seals oil container 16 in an air-tight manner in this case, a steadily increasing negative pressure will result in area 25 of oil container 16 as a function of time. This negative pressure will result in the fact that when the spinning rotor is stopped, no oil will pass through sealing element 20, not even if thin-bodied oil is used and sealing element 20 has coarse pores. When shaft 1 is turning, the negative pressure in area 27 causes oil to be sucked up until the negative pressure prevailing in area 25 of oil container 19 balances the negative pressure between sealing element 20 and shaft 9. Then, even with shaft 9 still turning, no more oil is drawn out of sealing element 20. This equilibrium state continues until the negative pressure inside the oil reservoir is decreased once more because of the slightly air-permeable wall of container 16. As soon as this takes place, more oil droplets are dispensed as shaft 9 turns, thus producing a periodic oil feed.

It is important for there to be equilibrium between the pressure in area 25 of oil container 16, the surface tension of lubricating oil 17, and the permeability of sealing element 20, preventing oil from emerging when the shaft is stopped. When the spinning rotor shaft is turning, this equilibrium is being constantly disturbed, either continuously or periodically. This then results in the desired escape of oil droplets which are swept away and atomized. In this manner, the known technical disadvantages of central lubrication and drop lubrication are avoided with a design which is simultaneously extremely simple and reasonable to manufacture.

While I have shown and described a single embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Open-end spinning machine apparatus comprising:

a spinning shaft having means at one end portion for carrying a spinning rotor and having means at another end portion for carrying a driving whorl, first roller bearing means having first roller elements bearingly engaged directly on said spinning shaft, second roller bearing means having second roller elements bearingly engaged directly on said spinning shaft at a position spaced from said first roller bearing means, and an oil-feed device for dispensing oil dropwise in the area between the first and second roller bearing means to lubricate said bearing means, said oil-feed device comprising sealing element means adjacent said spinning shaft, said sealing element means including means for dispensing oil only when a predetermined pressure differential prevails between the area adjacent the spinning shaft and the sealing element means, said pressure differential being dependent on the operating speed of the spinning shaft.

2. Apparatus according to claim 1, wherein the sealing element faces the spinning shaft with a surface which forms a groove between itself and the circumference of the spinning shaft, said groove widening in the rotational direction of the shaft.

3. Apparatus according to claim 2, wherein the sealing element means is composed of a porous material whose porosity is adjusted to the viscosity of the oil in such manner that the sealing element dispenses a specified amount of oil at a predetermined pressure differential.

4. Apparatus according to claim 1, wherein the sealing element means is composed of a porous material whose porosity is adjusted to the viscosity of the oil in such manner that the sealing element dispenses a specified amount of oil at a predetermined pressure differential.

5. Apparatus according to claim 1, wherein the sealing element seals an oil reservoir located above the spinning shaft.

6. Apparatus according to claim 5, wherein the oil reservoir is mounted in an encapsulated housing, said housing being provided with a metered, throttled air feed.

7. Apparatus according to claim 1, wherein the spinning shaft has a diameter which is enlarged in area between the first and second roller bearing means and especially in the area of the sealing element means of the oil-feed device, relative to inner races of the roller bearing means.

8. Apparatus according to claim 7, wherein the circumference of the spinning shaft is roughened in the area of the sealing element means.

9. Apparatus according to claim 7, wherein outer races for said roller bearing means are machined into an inner surface of a bushing surrounding said spinning shaft.

10. Apparatus according to claim 1, wherein outer races for said roller bearing means are machined into an inner surface of a bushing surrounding said spinning shaft.

11. Apparatus according to claim 10, wherein each roller bearing means has five balls as roller elements, the diameter of said balls being at least 50% of the diameter of the corresponding inner races of the spinning shaft.

12. Apparatus according to claim 1, wherein outer races for said bearing means are at a support bushing, said support bushing being supported in a housing with at least one impact- and vibration-damping intermediate bushing, said at least one intermediate bushing extending axially from the vicinity of the driving whorl to approximately the middle of the support bushing.

13. Apparatus according to claim 12, wherein at least two intermediate bushings arranged concentrically with respect to one another and made of materials with different properties are provided between said support bushing and said housing.

* * * * *